(12) United States Patent
Omi et al.

(10) Patent No.: US 7,632,049 B2
(45) Date of Patent: Dec. 15, 2009

(54) HOLE CUTTER

(75) Inventors: Shohei Omi, Anjo (JP); Kazuyoshi Inagaki, Anjo (JP)

(73) Assignee: OMI Kogyo Co., Ltd. (JP)

( * ) Notice: Subject to any disclaimer, the term of this patent is extended or adjusted under 35 U.S.C. 154(b) by 297 days.

(21) Appl. No.: 11/528,230

(22) Filed: Sep. 27, 2006

(65) Prior Publication Data
US 2007/0071564 A1   Mar. 29, 2007

(30) Foreign Application Priority Data
Sep. 28, 2005   (JP) .............. 2005-282522

(51) Int. Cl.
*B23B 51/04*   (2006.01)
(52) U.S. Cl. ..................... 408/206; 408/703
(58) Field of Classification Search ......... 408/204–209, 408/703; B23B 51/04, 51/05
See application file for complete search history.

(56) References Cited
U.S. PATENT DOCUMENTS 2,610,529 A * 9/1952 Atkinson .............. 408/59
3,387,511 A * 6/1968 Ackart, Sr. et al. .......... 408/230
3,609,056 A * 9/1971 Hougen ................... 408/204
4,586,857 A * 5/1986 Ohmi ..................... 408/206
4,596,499 A * 6/1986 Fangmann et al. .......... 408/206
5,145,296 A * 9/1992 Hougen ................... 408/1 R

FOREIGN PATENT DOCUMENTS

GB     2100151 A  * 12/1982
JP     05329706 A * 12/1993
JP     08252708 A * 10/1996
JP     2005040918 A * 2/2005

* cited by examiner

*Primary Examiner*—Daniel W Howell
(74) *Attorney, Agent, or Firm*—Fulwider Patton LLP

(57) ABSTRACT

The front cutting edge is provided with an inner front cutting edge connected with an inner lateral cutting edge and an outer front cutting edge connected with an outer lateral cutting edge. A front flank corresponding to the front cutting edge is provided with an inner front flank corresponding to the inner front cutting edge and an outer front flank corresponding to the outer front cutting edge. An inner front clearance angle of the inner front flank is set at a larger value than an outer front clearance angle of the outer front flank. Therefore, it is difficult for the hole cutter to be chipped, and its cutting performance is also good.

5 Claims, 3 Drawing Sheets

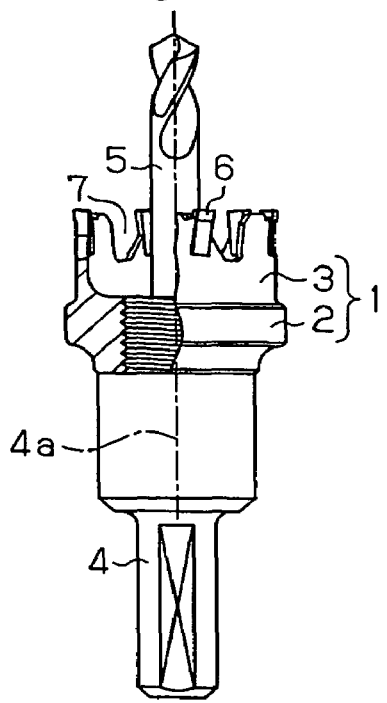
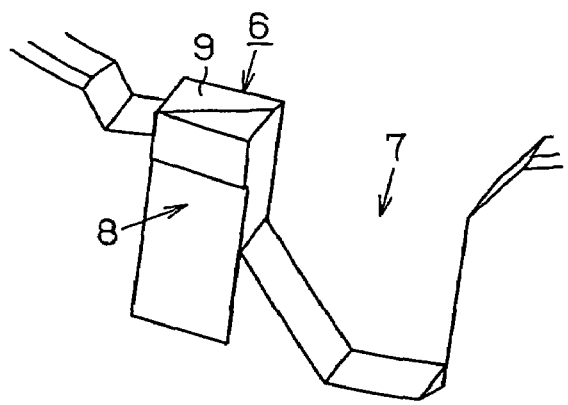
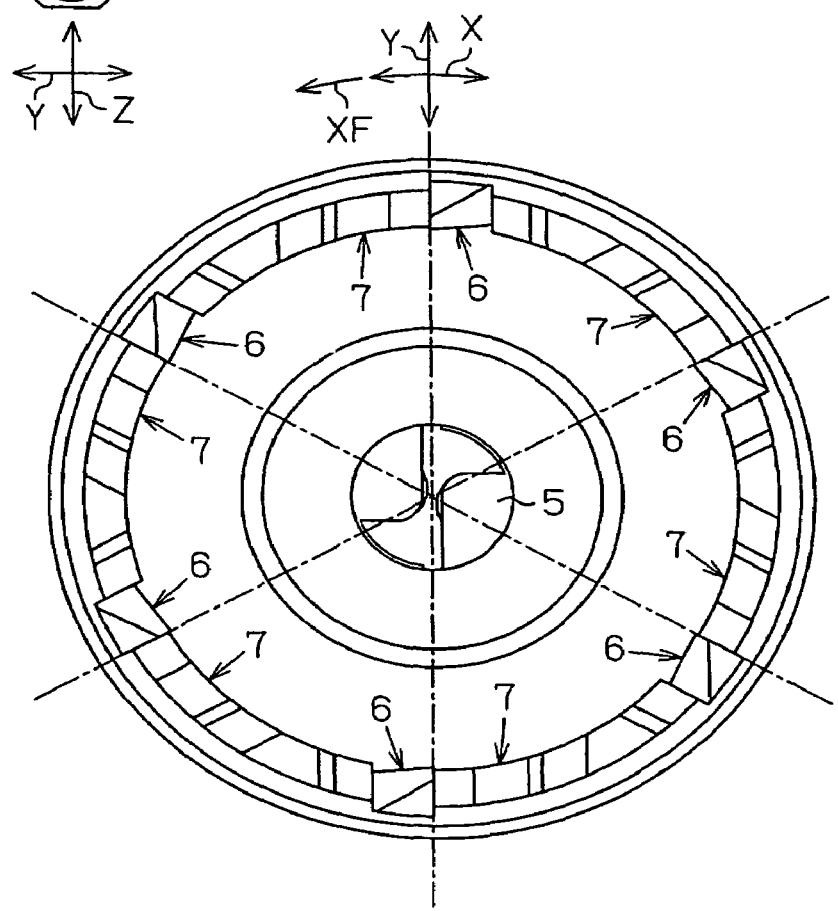

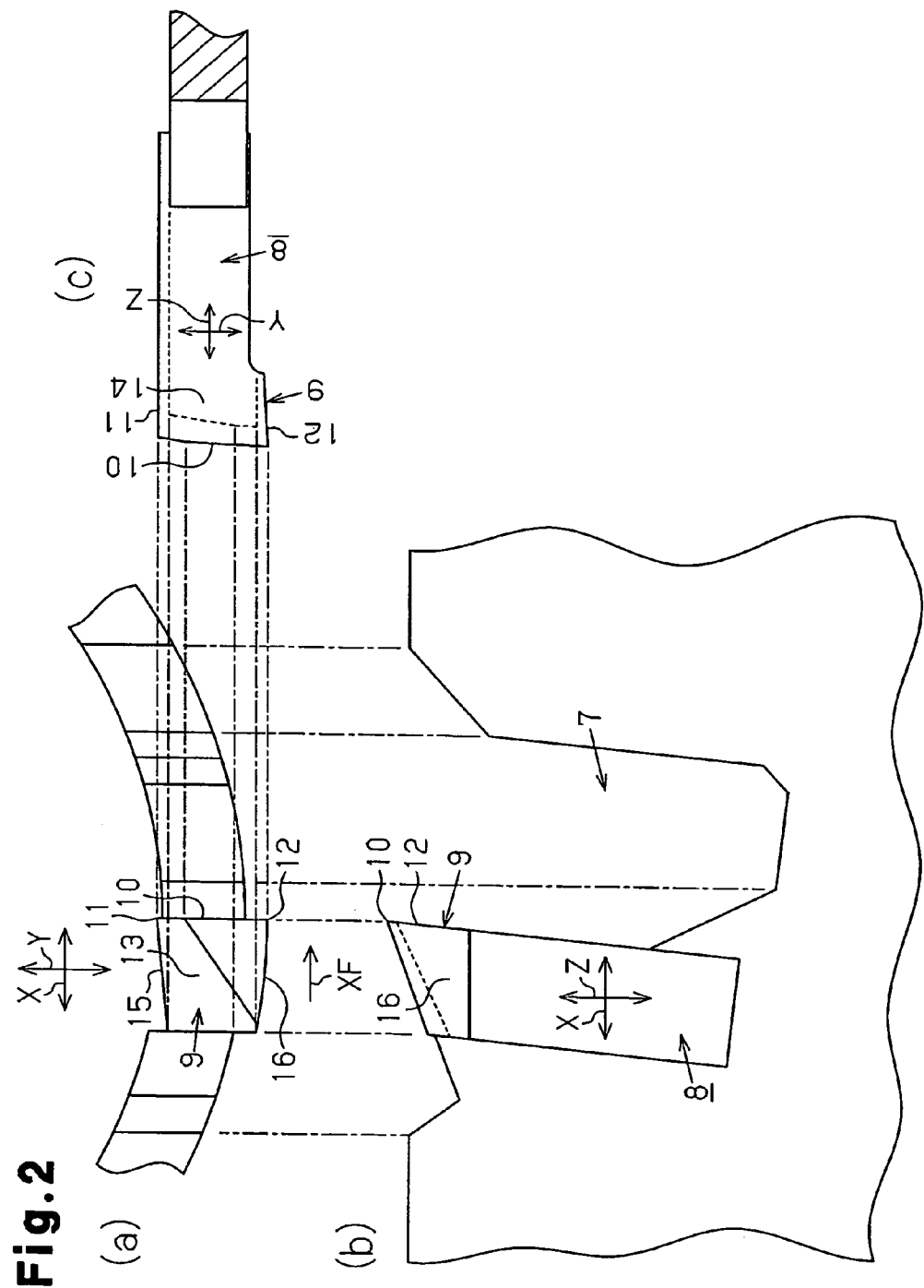

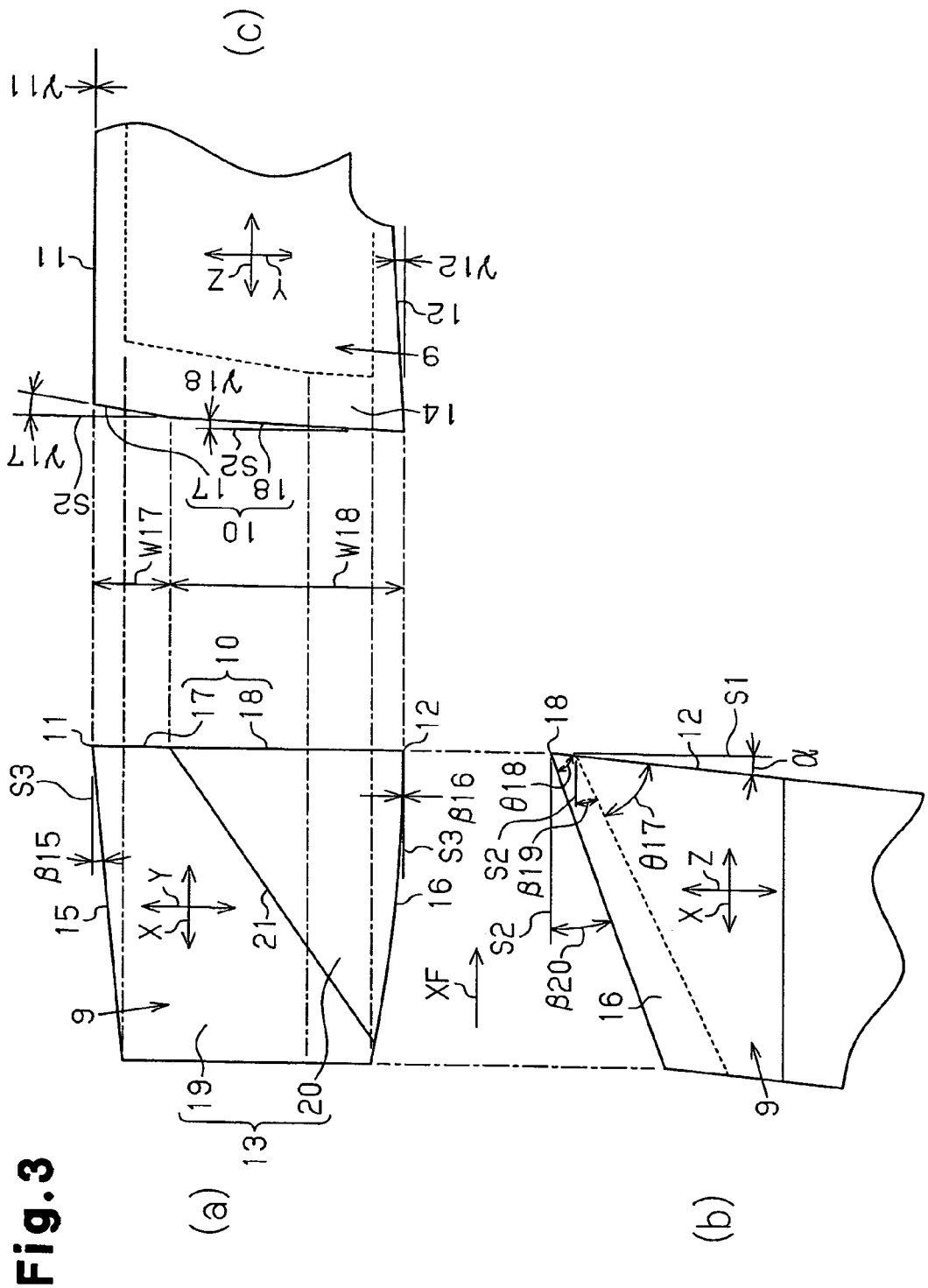

HOLE CUTTER

BACKGROUND OF THE INVENTION

The present invention relates to a hole cutter which has a blade cylinder provided on a rotating shaft and a plurality of edge portions arranged side by side at intervals in a rotational direction on an outer periphery of an end portion of the blade cylinder.

Conventionally, edge portions on this kind of hole cutter are provided with a front cutting edge, an inner lateral cutting edge, an outer lateral cutting edge, a front flank, a rake surface, an inner lateral flank and an outer lateral flank. The front cutting edge extends along a radial direction at the leading side along the rotational direction. The inner lateral cutting edge extends along a rotational center line on an inner side of the radial direction. The outer lateral cutting edge extends along the rotational center line on an outer side of the radial direction. The front flank includes the front cutting edge. The rake surface is surrounded by the front cutting edge, the inner lateral cutting edge and the outer lateral cutting edge. The inner lateral flank includes the inner lateral cutting edge. The outer lateral flank includes the outer lateral cutting edge. The front flank and the rake surface constitute an edging angle of the front cutting edge. The edging angle is set to a predetermined value so as to maintain the strength of the edge portion. A rake angle of the rake surface is also set to a predetermined value. When the edging angle and the rake angle have been determined, a front clearance angle of the front flank is determined naturally.

In circumstances where the rake angle is set to the predetermined value, if the front clearance angle is set to a large value, the edging angle is set to a small value. Because of this, the cutting performance of the edge portion is improved. However, an intersecting portion between the front cutting edge and the outer lateral cutting edge is the portion to which a cutting load is most applied when cutting is being started or terminated, and the intersecting portion thus becomes prone to chipping.

SUMMARY OF THE INVENTION

An objective of the present invention is to provide a hole cutter in which, by improving the configuration of the edge portions, the intersecting portion between a front cutting edge and an outer lateral cutting edge withstands chipping so that the strength of the intersecting portion and the cutting performance are maintained.

According to one aspect of the present invention, a hole cutter is provided that is provided with a blade cylinder having a rotational center line and a plurality of edge portions arranged side by side at intervals in a circumferential direction on an outer periphery of the end portion of the blade cylinder. Each edge portion is provided with a front cutting edge extending along a radial direction at one side of the circumferential direction, an inner lateral cutting edge extending along the rotational center line from a radially inner end portion of the front cutting edge and an outer lateral cutting edge extending along the rotational center line from a radially outer end portion of the front cutting edge. The front cutting edge is provided with an inner front cutting edge connected to the inner lateral cutting edge and an outer front cutting edge connected to the outer lateral cutting edge. The edge portion further has a front flank corresponding to the front cutting edge. The front flank is provided with an inner front flank corresponding to the inner front cutting edge and an outer front flank corresponding to the outer front cutting edge. An inner front clearance angle of the inner front flank is set at a larger value than an outer front clearance angle of the outer front flank.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 1A is a partially cutaway front view showing a hole cutter according to one embodiment of the present invention;

FIG. 1B is an enlarged plan view of the hole cutter of FIG. 1A;

FIG. 1C is a partially enlarged perspective view showing edge portions of the hole cutter of FIG. 1A;

FIG. 2 shows an enlarged edge portion of FIG. 1C in which part (a) is a front view, part (b) is an enlarged plan view, and part (c) is a cross sectional view as viewed from a side; and FIG. 3 shows a further enlarged edge portion of FIG. 2 in which part (a) is a front view, part (b) is an enlarged plan view, and part (c) is a cross sectional view as viewed from a side.

DETAILED DESCRIPTION OF THE PREFERRED EMBODIMENT

Hereinafter, one embodiment of the present invention will be described with reference to the drawings.

As shown in FIG. 1A, a blade body 1 of the hole cutter is provided with a proximal wall portion 2 and a blade cylinder 3 that is of a cylindrical shape and that protrudes from the proximal wall portion 2. A rotating shaft 4 is screwed onto the proximal wall portion 2. A center drill 5 is inserted into the rotating shaft 4. The center drill 5 protrudes from an open end portion of the blade cylinder 3 while passing through an inner side of the blade cylinder 3. As shown in FIG. 1B, at an outer periphery of the end portion of the blade cylinder 3, a plurality of edge portions 6 (for instance, six) and a plurality of groove portions (for instance, six) are arranged. These edge portions 6 and groove portions 7 are arranged side by side alternately in a rotational direction with a rotational center line 4a of the rotating shaft 4 as the center, in other words in the circumferential direction X. Between each adjacent pair of the edge portions 6 equidistant intervals are provided by the groove portions 7. As illustrated in FIG. 1C, tip edges 8 are provided on the respective edge portions 6. The tip edges 8 are attached to the blade cylinder 3 in a state in which they are adjacent to the groove portions 7. At pointed end parts of the respective tip edges 8, cutting edges 9 are formed in configurations (shapes and sizes) identical to one another.

As shown in FIG. 2 and FIG. 3, the respective cutting edges 9 are provided with a front cutting edge 10, an inner lateral cutting edge 11, an outer lateral cutting edge 12, a front flank 13, a rake surface 14, an inner lateral flank 15, and an outer lateral flank 16. The front cutting edge 10 extends along a radial direction Y in a rotational direction XF between both sides of a circumferential direction X. The inner lateral cutting edge 11 extends along a direction Z of the rotational center line 4a at an inner side of the radial direction Y. The outer lateral cutting edge 12 extends along a direction Z of the rotational center line 4a at an outer side of the radial direction Y. Specifically, the inner lateral cutting edge 11 extends from a radially inner end portion of the front cutting edge 10, and the outer lateral cutting edge 12 extends from a radially outer end portion of the front cutting edge 10. The front flank 13 includes the front cutting edge 10. The rake surface 14 is surrounded by the front cutting edge 10, the inner lateral cutting edge 11, and the outer lateral cutting edge 12. The inner lateral flank 15 includes the inner lateral cutting edge 11, and the outer lateral flank 16 includes the outer lateral cutting edge 12.

The front cutting edge 10 is separated into an inner front cutting edge 17 that is connected to the inner lateral cutting edge 11 and an outer front cutting edge 18 that is connected to the outer lateral cutting edge 12. The front flank 13 is separated into an inner front flank 19 including the inner front cutting edge 17 and an outer front flank 20 including the outer front cutting edge 18. Between the inner front flank 19 and the outer front flank 20, a boundary line 21 exists which extends from a boundary point between the inner front cutting edge 17 and the outer front cutting edge 18.

As shown in part (b) of FIG. 3, the inner front flank 19 and the rake surface 14 constitute an inner edging angle $\theta 17$ of the inner front cutting edge 17. The outer front flank 20 and the rake surface 14 constitute an outer edging angle $\theta 18$ of the outer front cutting edge 18. A YZ-imaginary plane S1 including the radial direction Y and a direction Z of rotational center line 4a is perpendicular to the circumferential direction X. The rake surface 14 constitutes a rake angle $\alpha$ relative to the YZ-imaginary plane S1. An XY-imaginary plane S2 including the circumferential direction X and the radial direction Y is perpendicular to the rotational center line 4a. When viewed from the radial direction Y the inner front flank 19 constitutes an inner front clearance angle $\beta 19$ relative to the XY-imaginary plane S2. When viewed from the radial direction Y the outer front flank 20 constitutes an outer front clearance angle $\beta 20$ relative to the XY-imaginary plane S2.

As shown in part (a) of FIG. 3, the inner lateral flank 15 constitutes an inner lateral clearance angle $\beta 15$ relative to the XZ-imaginary plane S3 that includes the circumferential direction X and the direction Z of rotational center line 4a. The outer lateral flank 16 constitutes an outer lateral clearance angle $\beta 16$ relative to the XZ-imaginary plane S3. The front cutting edge 10 intersects the circumferential direction perpendicularly.

As shown in part (c) of FIG. 3, when viewed from the circumferential direction X the inner front cutting edge 17 of the front cutting edge 10 constitutes an inner front cutting edge angle $\gamma 17$ relative to the XY-imaginary plane S2. When viewed from the circumferential direction X the outer front cutting edge 18 constitutes an outer front cutting edge angle $\gamma 18$ relative to the XY-imaginary plane S2. The inner lateral cutting edge 11 constitutes an inner lateral cutting edge angle $\gamma 11$ relative to the XZ-imaginary plane S3. The outer lateral cutting edge 12 constitutes an outer lateral cutting edge angle $\gamma 12$ relative to the XZ-imaginary plane S3.

As shown in part (b) of FIG. 3, the inner front clearance angle $\beta 19$ is set at a larger value than the outer front clearance angle $\beta 20$ ($\beta 20 < \beta 19$). For this reason, by adopting a rake angle $\alpha$ as a predetermined value, the outer edging angle $\theta 18$ becomes larger than the inner edging angle $\theta 17$ ($\theta 17 < \theta 18$). For instance, in a case where the rake angle $\alpha$ is six degrees, if the inner front clearance angle $\beta 19$ is twenty-three degrees, the inner edging angle $\theta 17$ becomes sixty-one degrees, and if the outer front clearance angle $\beta 20$ is eighteen degrees, the outer edging angle $\theta 18$ becomes sixty-six degrees. The rake angle $\alpha$ is set to zero to twenty degrees. From the viewpoint of maintaining the strength of the edge portions 6 it is preferable to set the inner edging angle $\theta 17$ or the outer edging angle $\theta 18$ from fifty-nine to sixty-nine degrees. It is preferable to set the ratio between the inner front clearance angle $\beta 19$ and the outer front clearance angle $\beta 20$ ($\beta 19:\beta 20$) to a degree of around 1.3:1.0.

Further, the inner front cutting edge angle $\gamma 17$ is set at a larger value than the outer front cutting edge angle $\gamma 18$ ($\gamma 17 > \gamma 18$). A radial direction dimension W17 of the inner front cutting edge 17 is set at a smaller value than a radial direction dimension W18 of the outer front cutting edge 18 (W17<W18). For instance, in a case where the inner front cutting edge angle $\gamma 17$ is ten degrees and the outer front cutting edge angle $\gamma 18$ is three degrees, the radial direction dimension W17 is 0.5 mm, and the radial direction dimension W18 is 1.5 mm. Further, the radial direction dimension W17 of the inner front cutting edge 17 may be set to the same value as the radial direction dimension W18 of the outer front cutting edge 18 (W17=W18).

Furthermore, in the present embodiment, the inner lateral clearance angle $\beta 15$ is set to five degrees, the outer lateral clearance angle $\beta 16$ is set to zero degrees, the inner lateral cutting edge angle $\gamma 11$ is set to zero degrees and the outer lateral cutting edge angle $\gamma 12$ is set to three degrees. However, the outer lateral clearance angle $\beta 16$ and the inner lateral cutting edge angle $\gamma 11$ are not limited to zero degrees, but may be set to appropriate angles.

A workpiece that is to be the cut is cut by rotating in the rotational direction XF the hole cutter configured in the above manner. In these circumstance, when cutting is being started or terminated the greatest cutting load is applied onto the intersecting portion between the outer front cutting edge 18 and the outer lateral cutting edge 12, namely, onto the boundary portion. However, in the present embodiment, since the outer edging angle $\theta 18$ is set at a larger value than the inner edging angle $\theta 17$, it becomes difficult for the intersecting portion between the outer front cutting edge 18 and the outer lateral cutting edge 12 to be chipped. Further, since the inner edging angle $\theta 17$ is set at a small value, it is still possible to maintain a good cutting performance on the part of the edge portions 6.

The above described embodiment has the following advantages.

(1) As shown in part (b) of FIG. 3, the inner front clearance angle $\beta 19$ is set at a larger value than the outer front clearance angle $\beta 20$. Therefore, the outer edging angle $\theta 18$ of the outer front cutting edge 18 constituted by the outer front flank 20 becomes larger than the inner edging angle $\theta 17$ of the inner front cutting edge 17 constituted by the inner front flank 19. For that reason, it is possible to maintain a cutting performance by decreasing the inner edging angle $\theta 17$, and by increasing the outer edging angle $\theta 18$ it is possible to make it difficult for the intersecting portion between the outer front cutting edge 18 and the outer lateral cutting edge 12 to be chipped.

(2) As shown in part (c) of FIG. 3, the inner front cutting edge angle $\gamma 17$ constituted by the inner front cutting edge 17 is set at a larger value than the outer front cutting edge angle $\gamma 18$ constituted by the outer front cutting edge 18. The radial direction dimension W17 of the inner front cutting edge 17 is set at an equal value to, or at a smaller value than, the radial direction dimension W18 of the outer front cutting edge 18. Therefore, it is easy to form the edge portions 6 in such a way that the inner front clearance angle $\beta 19$ becomes greater than the outer front clearance angle $\beta 20$.

(3) The rake surface 14, surrounded by the inner front cutting edge 17, the outer front cutting edge 18, the inner lateral cutting edge 11, and the outer lateral cutting edge 12, as shown in part (b) of FIG. 3, has a rake angle α. Therefore, it is easy to form the edge portions 6 in such a way that the inner front clearance angle β19 becomes greater than the outer front clearance angle β20.

(4) As shown in part (c) of FIG. 3, out of the inner lateral cutting edge 11 and the outer lateral cutting edge 12, at least the outer lateral cutting edge 12 has an outer lateral cutting edge angle γ12. Therefore, it is easy to form the edge portions 6 in such a way that the inner front clearance angle β19 becomes greater than the outer front clearance angle β20.

(5) As shown in part (a) of FIG. 3, out of the inner lateral flank 15 and the outer lateral flank 16, at least the inner lateral flank 15 has an inner lateral clearance angle β15. Therefore, it is easy to form the edge portions 6 in such a way that the inner front clearance angle β19 becomes greater than the outer front clearance angle β20.

Although the multiple embodiments have been described herein, it will be clear to those skilled in the art that the present invention may be embodied in different specific forms without departing from the spirit of the invention. The invention is not to be limited to the details given herein, but may be modified within the scope and equivalence of the appended claims.

In the edge portions 6 of the above described embodiment, the tip edge 8 is attached to the blade cylinder 3. However, this need not necessarily be the case, and the respective edge of the portions 6 may also be integrated with the blade cylinder 3.

What is claimed is:

1. A hole cutter comprising a blade cylinder having a rotational center line and a plurality of edge portions arranged side by side at intervals in a circumferential direction on an outer periphery of an end portion of the blade cylinder,
wherein each edge portion includes a front cutting edge extending along a radial direction at one side of a circumferential direction, an inner lateral cutting edge extending along a rotational center line from a radially inner end portion of the front cutting edge, and an outer lateral cutting edge extending along the rotational center line from a radially outer end portion of the front cutting edge,
wherein the front cutting edge includes an inner front cutting edge connected with the inner lateral cutting edge, and an outer front cutting edge connected with the outer lateral cutting edge,
wherein each edge portion further includes a front flank corresponding to the front cutting edge, and wherein the front flank includes an inner front flank corresponding to the inner front cutting edge, and an outer front flank corresponding to the outer front cutting edge, and
wherein an inner front clearance angle of the inner front flank is set at a larger value than an outer front clearance angel of the outer front flank,
wherein when an imaginary plane perpendicular to the rotational center line is adopted as a perpendicular flat surface,
as viewed from the radial direction, the inner front clearance angle is an inclined angle of the inner front flank relative to perpendicular flat surface, and
as viewed from the radial direction, the outer front clearance angle is an inclined angle of the outer front flank relative to the perpendicular flat surface,
wherein the ratio between the inner front clearance angle to the outer front clearance angle is set to 1.3:1.0,
wherein the inner front clearance angle is set to twenty-three degrees, and the outer front clearance angle is set to eighteen degrees.

2. The hole cutter according to claim 1,
wherein an inner front cutting edge angle of the inner front cutting edge is set at a larger value than an outer front cutting edge angle of the outer front cutting edge, and
wherein a radial direction dimension of the inner front cutting edge is set equal to or smaller than a radial direction dimension of the outer front cutting edge,
wherein when an imaginary plane perpendicular to the rotational center line is adopted as the perpendicular flat surface,
as view from a circumferential direction, the inner front cutting edge angle is an inclined angle of the inner front cutting edge relative to the perpendicular flat surface, and
as viewed from a circumferential direction, the outer front cutting edge angle is an inclined angle of the outer front cutting edge relative to the perpendicular flat surface,
wherein in a case where the inner front cutting edge angle is ten degrees and the outer front cutting edge angle is three degrees, the radial direction dimension of the inner front cutting edge is set to 0.5 mm, and the radial direction dimension of the outer front cutting edge is set to 1.5 mm.

3. The hole cutter according to claim 1,
wherein each edge portion includes a rake surface surrounded by the inner front cutting edge, the outer front cutting edge, the inner lateral cutting edge and the outer lateral cutting edge, and the rake surface has a rake angle,
wherein the rake angle is an inclined angle relative to an imaginary plane perpendicular to the circumferential direction,
wherein the rake angle is set to six degrees.

4. The hole cutter according to claim 3, wherein, out of the inner lateral cutting edge and the outer lateral cutting edge, at least the outer lateral cutting edge has an angle relative to an imaginary plane perpendicular to the radial direction,
wherein the outer lateral cutting edge angle is set to three degrees.

5. The hole cutter according to claim 3, wherein out of the inner lateral flank and the outer lateral flank, at least the inner lateral flank has an angle relative to an imaginary plane perpendicular to the radial direction,
wherein the inner lateral flank angle is set to five degrees.

* * * * *